A. M. ALGEO.
MECHANISM FOR MAKING GLASS ARTICLES.
APPLICATION FILED NOV. 15, 1913.
1,177,589.
Patented Apr. 4, 1916.
4 SHEETS—SHEET 1.
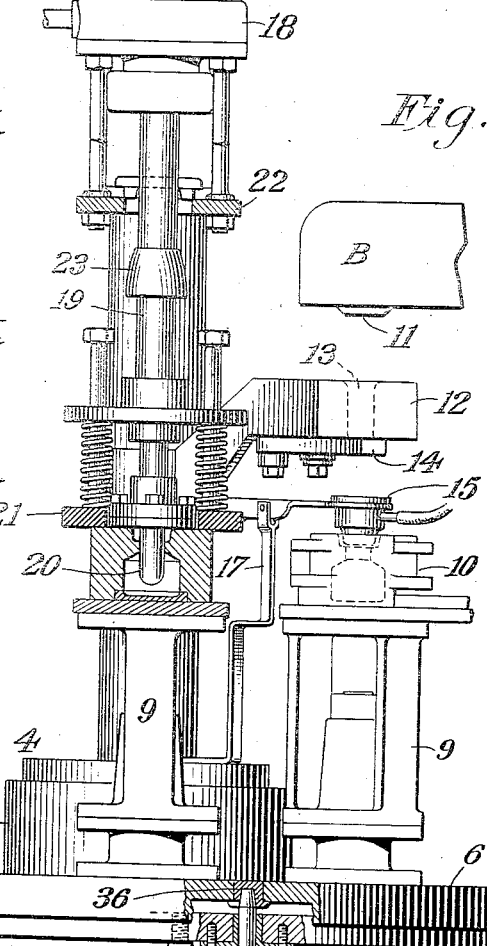
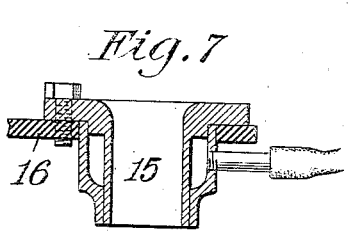
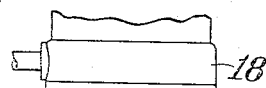
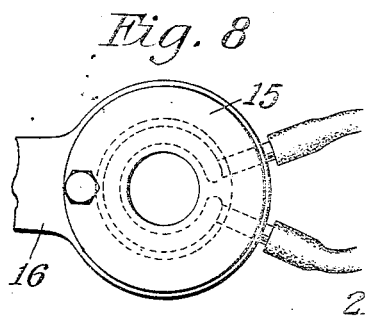
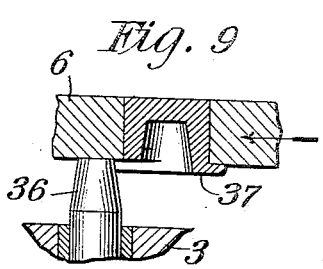
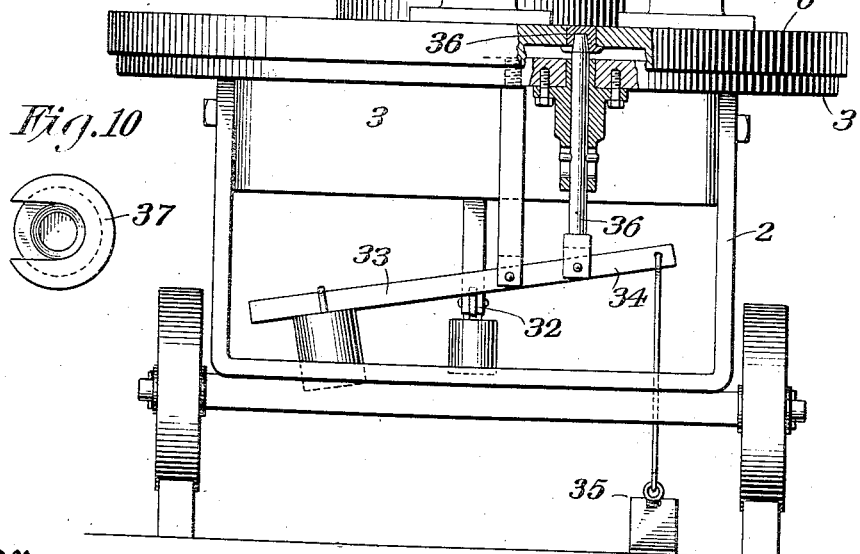

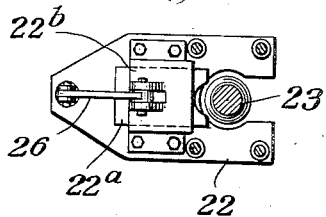
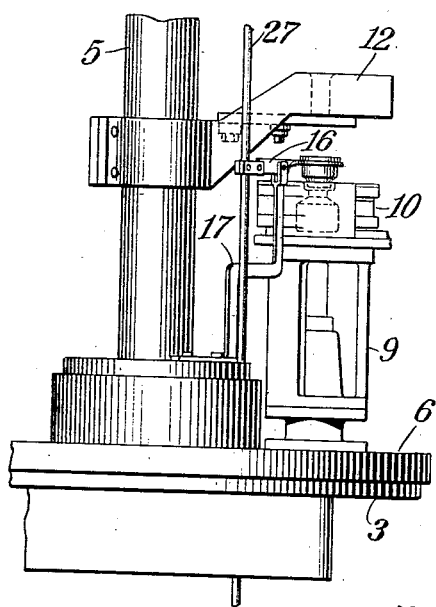
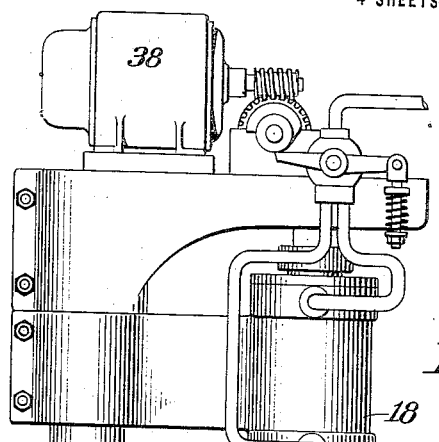
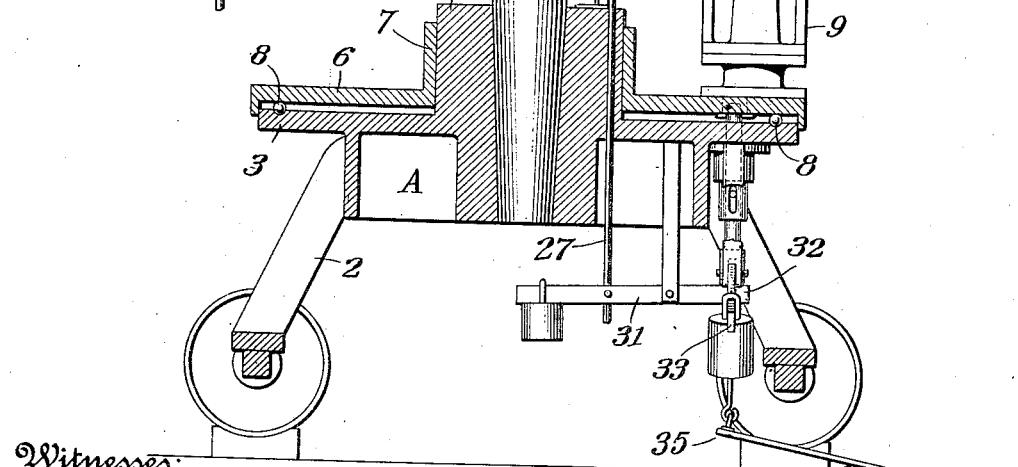

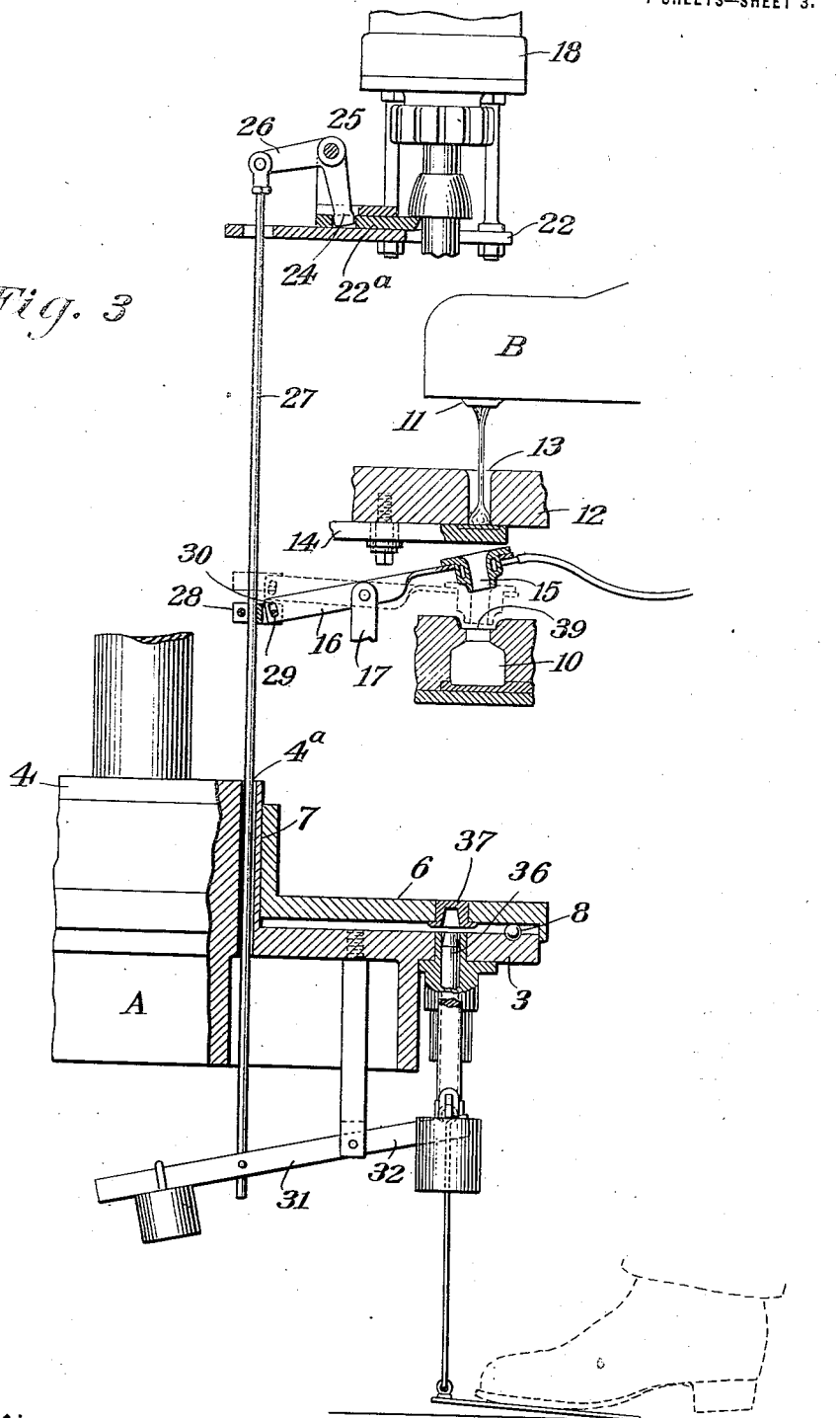

A. M. ALGEO.
MECHANISM FOR MAKING GLASS ARTICLES.
APPLICATION FILED NOV. 15, 1913.

1,177,589.

Patented Apr. 4, 1916.
4 SHEETS—SHEET 4.

Witnesses:
Raphaël Setter
C. D. Morrill

Inventor
Albert M. Algeo
By his Attorney
Clarence Stern

UNITED STATES PATENT OFFICE.

ALBERT M. ALGEO, OF WASHINGTON, PENNSYLVANIA, ASSIGNOR TO HAZEL-ATLAS GLASS COMPANY, A CORPORATION OF WEST VIRGINIA.

MECHANISM FOR MAKING GLASS ARTICLES.

1,177,589.     Specification of Letters Patent.     Patented Apr. 4, 1916.

Application filed November 15, 1913. Serial No. 801,187.

*To all whom it may concern:*

Be it known that I, ALBERT M. ALGEO, a citizen of the United States, residing at Washington, Washington county, Pennsylvania, have invented new and useful Improvements in Mechanism for Making Glass Articles, of which the following is a specification, reference being had to the accompanying drawings, in which—

Figure 4:
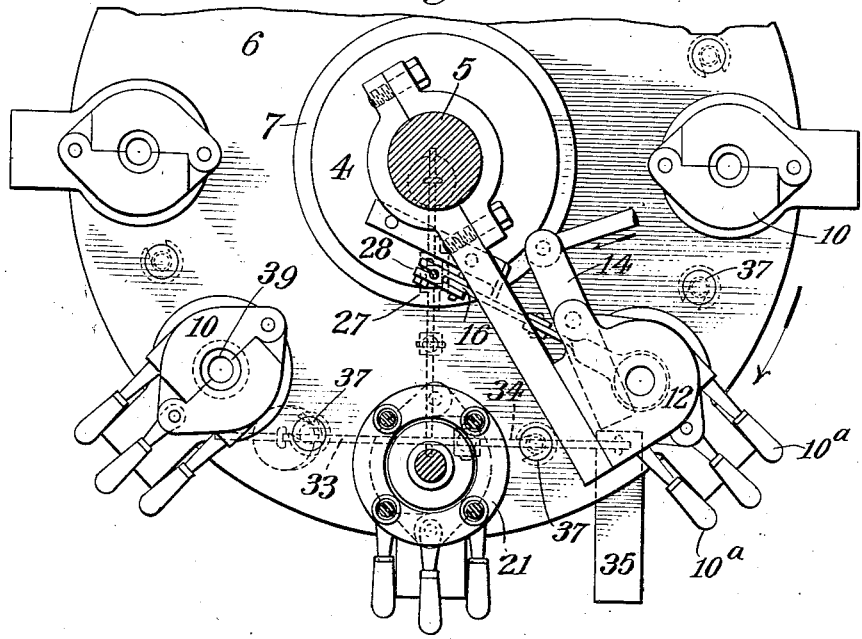
Figure 11:
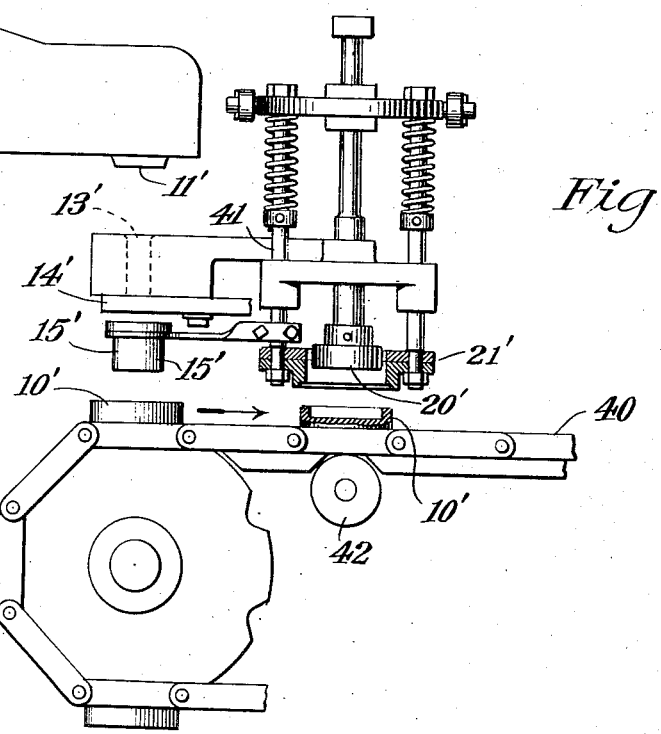

Figure 1 shows an elevation of my improved mechanism; Fig. 2 is an elevation partly in section; Fig. 3 is a diagrammatic view, partly in section; Fig. 4 is a section on lines IV—IV of Fig. 2; Fig. 5 is a detail view showing the coöperation of the mold and guide ring; Fig. 6 is a section on lines VI—VI of Fig. 2; Figs. 7 and 8 show details of the guide ring; Figs. 9 and 10 show details of the stop for the table; and Fig. 11 shows a modified form of my device.

My invention relates to glass making apparatus adapted to receive the molten glass flowing direct from the furnace and to transmit it into a plurality of molds.

My invention provides for controlling and guiding the stream of glass flowing from the furnace and for depositing it in predetermined quantities in the molds, and it also consists in the arrangement and coöperation of parts which I shall hereinafter describe and claim.

Referring to the drawings, A indicates a mold carriage and B the furnace. The mold carriage A is comprised of suitable framework 2 upon which is mounted a stationary table 3, having a hub or boss 4 in which is positioned a standard 5. The movable mold table 6 has a sleeve 7 adapted to take about the hub 4, and suitable bearings 8 are provided which permit the easy rotation of the movable mold table 6 upon the stationary table 3. Secured upon the top of the movable table 6 are a plurality of mold stands 9, and attached to these mold stands 9 are the molds 10, which may be of any suitable shape. Located below the furnace mouth 11 and in vertical alinement therewith is a casting 12, mounted on the standard 5, which contains a bottomless receptacle 13. Pivotally mounted on the casting 12 and operated by suitable power is a reciprocating cutting-off knife 14, which is adapted to reciprocate across the lower opening of the receptacle 13 and cut off the glass flowing therethrough, and which serves to hold the glass in the receptacle 13 until the next reciprocation moves the knife out of the way. Between the receptacle 13 and the molds 10, which are adapted to pass directly under the receptacle 13, is the air or water cooled guide ring 15, which is mounted on the outer end of the guide-ring lever 16. The lever 16 is pivoted to a support 17 which is mounted on the hub 4. Upon the upper part of the standard 5 is mounted an air pressure cylinder 18, in which the plunger shaft 19 reciprocates. The plunger 20 is secured to the lower end of the plunger shaft 19 and the spring plate mechanism 21 is attached to the shaft 19 a short distance above the plunger 20. Depending from the air pressure cylinder 18 is a slide mounting 22, in which is positioned the plunger trip slide $22^a$, which coöperates with a cone-shaped collar 23 on the plunger to prevent its descent when the molds are in motion and are not in registry with the plunger.

The operating mechanism for the trip slide $22^a$ and for the guide ring 15 is comprised as follows: The trip slide $22^a$ is actuated by an arm 24 of a bell crank lever 25 mounted on the guide member $22^b$, and the other arm 26 of the lever 25 is secured to an actuating rod 27, which is adapted to reciprocate through an opening $4^a$ in the stationary hub 4. Carried by the rod 27 is a clamp 28 which is connected to the rear end of the guide-ring lever 16 by a bolt 29 which passes through an elongated aperture 30 in the lever. The rod 27 extends through the opening $4^a$ in the hub 4 to the under side of the table 3, and at its lower end is attached to the weighted end of the counterbalanced lever 31, which is pivotally suspended beneath the mold table. The opposite end 32 of the lever 31 underlies the weighted end of another counterbalanced lever 33, also pivotally suspended from the mold table, and the opposite end 34 of this lever 33 is secured to a foot treadle 35. Attached to the second counterbalanced lever 33 is a trigger or stop 36, which is reciprocated by the action of the lever 33 through the fixed table 3 into a socket 37 in the revolving table 6. As many sockets 37 are employed as there are molds 10, so that the revolution of the table may be halted in such manner that one mold will underlie the plunger 20 and the succeeding mold will underlie the furnace mouth 11, the receptacle 13 and the guide ring 15.

The operation of the cutting knife 14 is timed so that its backward stroke is made at the same time as the downward stroke of the plunger. The cut-off mechanism and the plunger mechanism may be operated in any suitable manner, as by the motor 38. The mold table 7 is adapted to be operated automatically or by hand in a clockwise direction, and when so actuated the operator times the movement of the table to the stroke of the plunger.

The operation of my device is as follows: When the machine is in operation, and with the parts in the position shown in Fig. 3, the operator revolves the mold table 6 by the mold handles $10^a$ so that a mold will swing into vertical alinement with the guide ring 15 and the receptacle 13. The operator will then remove his foot from the foot treadle 35. The counterbalanced lever 33 will throw the trigger or stop 36 upward into a socket 37 in the revolving table 6, thereby stopping the table from rotation and bringing it to rest with an empty mold 10 directly beneath the guide ring 15 and the receptacle 13. The fall of the weighted end of the counterbalanced lever 33 will depress the raised end 32 of the counterbalanced lever 31, and the counterbalanced lever 31 will shift the actuating rod 27 in a vertical direction. The actuating rod 27, as it is raised, will depress the guide ring 15 so that its lower surface will enter the mouth 39 of the mold, and at the same time the cutting-off knife 14 will reciprocate on its backward stroke and will permit the glass which has collected in the receptacle 13 to fall through the guide ring 16 into the mold. The actuating rod 27, simultaneously with the stopping of the table and the lowering of the ring 15 into guiding position, will withdraw the trip slide $22^a$ from the advanced position shown in Fig. 3, in which it coöperates with the plunger collar 23 to interrupt the descent of the plunger 20. This retraction of the trip slide $22^a$ permits the plunger 20 to descend and form the glass into the desired shape in the mold which has been filled in the preceding operation. When the mold lying underneath the guide ring 15 and the receptacle 13 has been filled, the operator will again place his foot on the treadle simultaneously as the reciprocating knife takes its forward stroke and cuts off the downwardly-flowing glass from the furnace mouth 11 and the receptacle 13. This action will retract the trigger or stop 36 from the socket 37, will lift the guide ring 15 out of the mouth of the mold and will advance the trip slide $22^a$ so as to interrupt the next descent of the reciprocating plunger by its contact with the collar 23. As the guide ring 15 lifts out of the mouth 39 of a mold 10 it straightens out the falling end of the stream of glass, which has just been cut off by the knife 14, guiding and centering it so that it will fall directly into the mold 10 instead of being thrown by the blow from the knife 14 over the edge of the mold. The operator then moves the mold table from right to left, so that the mold which has just been filled as described will come to rest at the next station below the plunger 20. The operation is then repeated, the succeeding mold is filled with glass, and the plunger operates on the glass in the mold just brought to rest beneath it.

The use of the guide ring is of great advantage, since it guides the cut end of the stream of glass straight into the mold and keeps the edges of the mold free from glass. The presence of the glass in the mouth or on the edge of the mold is a cause of frequent damage to both plunger and to the molds, and is also the cause of the loss of a considerable proportion of the articles during molding, since it prevents the formation of articles of irregular shape and of unsalable character. This wear and tear, and loss, is prevented by the use of the guide ring 15, which keeps the mouth and edges of the mold clear of glass. I have also found that my improved mechanism is especially desirable for making small articles of glass, since the guiding of the cut-off ends of the stream of glass into the molds prevents the distortion of the glass in the mold which formerly occurred when the cut-off ends were thrown over the edge of the mold, and was responsible for the making of a large number of defective articles. The regulation of the action of the plunger by the trip slide $22^a$ is also of great advantage, since it prevents the plunger from descending until the mold which is to be operated upon is brought into exact alinement beneath the plunger. Heretofore great difficulty has been experienced in bringing the molds when they were hand-operated into exact alinement with the plunger, so that when the plunger descended with the molds not quite in alinement damage immediately resulted both to the molds and to the plunger.

In Fig. 11 I have shown a modified form of my device, in which the molds 10' are mounted on an endless belt 40, which is driven in such manner as to give it an intermittent motion. The operation of the device is so arranged that as each mold 10' comes into vertical alinement with the receptacle 13' and the furnace mouth 11', the mold will be halted, the guide ring 15' will drop into the mouth of the mold 10' and the cut-off knife 14' will be drawn back on its backward stroke, thereby permitting the glass to descend into the mold. The cut-off knife 14' will then advance on its forward stroke, cutting off the stream of glass from the receptacle 13' and the furnace mouth 11', and the belt 40 will then advance and the filled mold will come into alinement with the plunger 20' and a succeeding unfilled mold will be brought into alinement with the receptacle 13' and the furnace mouth 11'. The spring plate 21' will descend upon the filled mold 10', and the stroke of the plunger 20' is so timed that the plunger will come down, and form the article just after the spring plate 21' is in position upon the top of the mold. The guide ring 15' is mounted upon the supporting mechanism 41 of the spring plate 21', and when the spring plate comes down it carries with it the guide ring 15'. When the guide ring 15' is again in position on the mouth of the succeeding mold, the cut-off knife 14' is again retracted on its backward stroke and the glass will flow into the succeeding mold. The idler 42 acts as an anvil for the stroke of the plunger 20'.

It is obvious that many changes may be made in the construction and operation of the mechanisms which I have described and shown herein without departing from my invention.

What I claim is:

1. Mechanism for making articles of glass, comprising means for supporting and severing a freely flowing stream of molten glass, a mold carrier having a plurality of molds mounted thereon adapted to pass beneath the supporting means, and a guide ring mounted above the molds adapted to seat in the mouth of each mold during the filling operation and to be retracted therefrom to permit the mold to be moved from beneath the supporting and severing means.

2. Mechanism for making articles of glass comprising means for supporting and severing a freely flowing stream of molten glass, a mold carrier having a plurality of molds mounted thereon adapted to pass beneath the supporting means and in vertical alinement therewith and a funnel shaped guide ring, means for reciprocating the said ring in a vertical direction, the said ring coöperating with each mold in succession to guide the molten glass thereinto.

3. In mechanism for making articles of glass, comprising means for supporting and severing a freely flowing stream of molten glass, a mold carrier having a plurality of molds mounted thereon adapted to pass beneath the supporting means and in vertical alinement therewith, and a guiding device for said freely flowing stream arranged about said stream and in vertical alinement with the supporting means and adapted to come into register with the molds in succession, and means for reciprocating said guiding device to center a cut end of the freely flowing stream and guide it into the mold.

4. Mechanism for making articles of glass consisting of a delivery spout, a mold carrier having mounted thereon a plurality of molds, a cut-off mechanism for severing the glass as it flows from the delivery spout, a funnel shaped guiding mechanism arranged when in operative position in vertical alinement with the delivery spout, the cut off mechanism and each mold in succession, means for reciprocating the guide mechanism in a vertical direction to center the severed end of the glass as it drops into a mold, and plunger mechanism for forming the glass, each of the molds being adapted to pass under the guiding mechanism and under the plunger mechanism to permit the successive coöperation of these mechanisms therewith.

5. Mechanism for making articles of glass, comprising a mold carrier having a plurality of molds mounted thereon, a guide ring adapted to enter the mouth of the mold for guiding and centering the molten glass as it falls into the mold, plunger mechanism adapted to operate upon a filled mold when a succeeding mold underlies and is in registry with the guide ring, a trip slide adapted to coöperate with the plunger mechanism to prevent its descent except when a mold is in vertical alinement therewith, and an actuating rod for simultaneously reciprocating the guide ring and the trip slide.

6. Apparatus for making articles of glass, comprising means for supporting and severing a freely flowing stream of molten glass, a movable carrier having mounted thereon a plurality of molds, the said molds being adapted to pass under and in vertical alinement with the said supporting and severing means, a guide ring positioned directly underneath the said supporting and severing means and adapted to guide the flowing and severed glass into a mold, a reciprocating plunger mounted above the molds and adapted to form the glass in a mold, a plunger-arresting device for keeping the plunger out of contact with the molds except when a mold is in vertical alinement therewith, means for halting successive molds in alinement with the plunger and guide ring, and actuating mechanism for the plunger-arresting device, the guide ring and the carrier-halting means.

ALBERT M. ALGEO.

Witnesses:
JOHN W. McDOWELL,
JAMES W. McDOWELL.